United States Patent [19]

Masse et al.

[11] Patent Number: 4,614,246

[45] Date of Patent: Sep. 30, 1986

[54] POWERED WHEEL CHAIR

[76] Inventors: James H. Masse, Rte. 2; Patrick J. Masse, 920 4th St., both of DePere, Wis. 54115

[21] Appl. No.: 754,596

[22] Filed: Jul. 15, 1985

[51] Int. Cl.⁴ ............................................. B62D 11/04
[52] U.S. Cl. ................................... 180/6.5; 180/907; 297/330; 297/346; 297/DIG. 4
[58] Field of Search ................ 180/6.5, 907; 280/657, 280/650; 297/330, 346, DIG. 4

[56] References Cited

U.S. PATENT DOCUMENTS

| | | | |
|---|---|---|---|
| 3,111,181 | 11/1963 | Yatich | 180/907 X |
| 3,807,795 | 4/1975 | Weant | 180/6.5 |
| 4,351,562 | 9/1982 | Twitchell et al. | 180/907 X |

FOREIGN PATENT DOCUMENTS

| | | | |
|---|---|---|---|
| 1284564 | 12/1968 | Fed. Rep. of Germany | 297/DIG. 4 |
| 2125285 | 3/1984 | United Kingdom | 297/DIG. 4 |

Primary Examiner—John A. Pekar
Attorney, Agent, or Firm—James E. Nilles

[57] ABSTRACT

The wheel chair of this invention has its seat member supported for raising and lowering on a chassis having a castering rear wheel and two relatively small front wheels rotatable on a common axis, each driven independently of the other by a reversible electric motor. A brake member is pivoted to the chassis to swing up from and down to an extended position in which the rear wheel is above the surface and the brake member cooperates with the front wheels to support and immobilize the wheel chair. Swinging legs so support the chair element on the chassis that as the chair element is lowered it moves forward over the footrest so that the footrest does not hamper the occupant in transferring to and from the wheel chair.

12 Claims, 6 Drawing Figures

POWERED WHEEL CHAIR

FIELD OF THE INVENTION

This invention relates to powered wheel chairs and is more particularly concerned with a powered wheel chair having features that facilitate an occupant's transfer between it and another seat and which is very compact and maneuverable so as to be satisfactory for operation in confined spaces.

BACKGROUND OF THE INVENTION

Numerous patents have issued on powered wheel chairs, each disclosing one or more features intended to solve a problem or problems commonly encountered by a wheel chair occupant. By way of example, and without attempting to be exhaustive, reference may be made to the following:

French Pat. No. 2,399,822 discloses a motorized wheel chair having powered main wheels at its opposite sides rotating on a common axis under the seat, at least one castered wheel located forward of the seat, and a pair of castered wheels some distance behind the seat. The front castered wheel is upwardly retractable to enable the wheel chair to move up onto a curb under its own power, and the seat can be raised and lowered to suit the occupant's convenience. However, the location of the front wheel and of the footrest are such that one or both of them are in the way of the occupant's feet during transfer between the wheel chair and another seat. The wheel chair structure as a whole is undesirably long from front to rear and an inherently large turning radius further makes it unsuitable for confined spaces such as toilet stalls and elevators.

U.S. Pat. No. 2,849,051 discloses a powered wheel chair wherein the seat member of the chair element can be raised, lowered, and tilted to some extent, the back rest can be tilted independently of the seat member to be brought to a reclining position, and the footrest is adjustable as to height and position but nevertheless cannot be brought to a position in which it is out of the way of the occupant's feet during transfer between the wheel chair and another seat.

U.S. Pat. No. 4,119,163 discloses a self-propelled wheel chair capable of climbing a curb and having a chair element that can be raised and lowered; but, as in the case of the above mentioned French patent, a front wheel and the footrest are in the occupant's way during transfer between the wheel chair and another seat.

U.S. Pat. No. 3,807,795 discloses a motorized wheel chair that has the seat member and back rest of its chair element so connected and so actuatable that the occupant can be brought to a standing position. The device is intended for those who are infirm rather than for those who cannot control their legs, and, again, it does not facilitate transfers between the wheel chair and another seat.

The problem of transfer that is repeatedly mentioned above is addressed in U.S. Pat. No. 3,952,822, wherein the chair element is mounted to swivel on a chassis that has power driven wheels at its opposite sides and has a steerable front wheel asymmetrically located near one side of the chassis and a footrest alongside that steerable wheel, adjacent to the other side of the chassis. As the chair element is rotated about its swivel axis, the occupant's feet are carried away from the footrest and the steerable front wheel. However, the advantage of the device with respect to facilitating transfer is offset by marked disadvantages, one of which is apparent from the patent itself. Because of the asymmetrical location of the front wheel, the device lacks stability, and therefore auxiliary support wheels are mounted on the chassis, at its side opposite the steerable wheel, one behind the main wheel, the other in front of it. These support wheels are normally spaced above the surface on which the device rides, and they engage that surface only when the device tilts to a certain extent. They may prevent the chair from tipping over, but they do permit a certain amount of sideward tilting that can give the occupant feelings of insecurity. The disclosed structure provides for forward and rearward adjustment of the seat relative to its swiveling axis but does not provide for heightwise adjustment, although adjustability of the seat in height is of particular importance in facilitating transfer.

One need only think about the occasional need for a wheel chair occupant to transfer between a wheel chair and a toilet seat to understand the great importance that attaches to transferring safely, easily and without assistance between a wheel chair and another seat. For any such transfer three factors are essential to the wheel chair occupant: the wheel chair must be securely confined against any horizontal movement; there should be nothing in the way of the occupant's feet and legs to hamper or impede the transfer; and the seat member of the wheel chair must be adjustable as to height because the seat to which the occupant is transferring must be at the same height as the one from which transfer is being made or a little lower—never higher.

Most conventional wheel chairs have castering front wheels and retractable footrests that project in front of the main wheels. Usually the footrests are retracted by swinging them upward, and in that case they can present more of a problem during a transfer than if they are left in their operative positions. In any event, a wheel chair occupant's disability may make manual retraction of footrests difficult or impossible.

During transfer, the occupant tends to impose high lateral forces on the wheel chair that must be resisted by secure braking. Normally, castered front wheels cannot be confined against rotation or swiveling, and they therefore allow highly leveraged horizontal forces to be applied to the main wheels that can overcome a braking force on them.

Adjustability of seat height must be sufficient to bring the wheel chair seat member down to the level of the lowest seat to which the occupant might transfer and up to a level at which the occupant has comfortable access to a counter or the like that is intended for use by standing persons.

Almost invariably a toilet is located in a confined space in a bathroom or stall, and therefore another essential of a satisfactory wheel chair is extreme maneuverability, including capability for turning around on the spot. In this respect it will also be obvious that the overall length and width dimensions of the wheel chair should be as small as possible.

What might be considered "roadability" of a motor driven wheel chair is also important. It must be capable of moving forward at a reasonably fast speed; it should provide for easy and accurate one-handed control of speed, forward and rearward direction and turning; and—perhaps most important—it should be extremely stable and resistant to tipping over.

Stability of the wheel chair when it is braked as well as when it is rolling is of the utmost importance when the wheel chair is used as the driver's seat of a specially equipped van or the like that the wheel chair occupant drives, since the wheel chair must then be capable of supporting substantially high forces in every horizontal direction.

Satisfying these requirements poses a number of problems with respect to the structure of the wheel chair itself. The conventional source of power for a motorized wheel chair—and the only one known to be practical for the purpose—comprises one or more rechargeable batteries. Storage batteries are of course notoriously heavy and bulky, and batteries capable of storing enough energy for a day's operations occupy a substantial volume. In addition to the batteries, the wheelchair chassis must support motors or other actuators for driving the wheels, for raising and lowering the chair element, and for such additional movements or operations as may be required. All of this equipment must be so arranged that it is as compact as possible, does not interfere with mechanism for raising and lowering the seat, and ensures a low center of gravity and good riding stability for the device. The occupant of the wheel chair should be able to control all movements and other operations of the chair, preferably by means of control instrumentalities that are grouped to be accessible to one hand and are self-explanatory in relation to the functions that they control.

SUMMARY OF THE INVENTION

The general object of the present invention is to provide a self-propelled wheel chair that has good "roadability", has compact length and width dimensions, can turn around in its own length, and has a seat element which can be raised and lowered to facilitate transfers and which moves up and down with components of tilting and translatory motion that further facilitate transfer.

Another object of this invention is to provide a highly maneuverable self-propelled wheel chair which is very readily maneuverable, even in confined spaces, and which has a brake that ensures security and stability of the wheel chair when it is stopped, positively confining it against both horizontal movement and tilting.

A more specific object of the invention is to provide a self-propelled wheel chair which achieves the above stated objects and which is nevertheless structurally simple, sturdy and compact.

In general, these and other objects of the invention which will appear as the description proceeds are achieved in the wheel chair of this invention, which is of the type that comprises a chair element having a seat member with front and rear edges and an upwardly projecting back rest, a chassis on which the chair element is supported, wheels on the chassis, and power drive means on the chassis whereby certain of the wheels are driven. The wheel chair of this invention is characterized in that the wheels comprise two front wheels, one at each side of the chassis, confined to rotation on a common axis that is near a vertical plane containing a front edge of the seat member, and a rear wheel which has a castering connection with the chassis to swivel about a vertical axis that is spaced a substantial distance behind said common axis and is substantially equidistant from the two front wheels. The drive means comprises a pair of reversible motors, one for each of said front wheels, each said motor being connected with its front wheel to drive the same independently of the other front wheel. The wheel chair is further characterized by a brake member having a surface-engaging lower end portion and means mounting the brake member on the chassis for movement relative thereto between an upwardly retracted position in which all portions of the brake member are spaced above a plane tangent to the bottoms of all of said wheels and a downwardly extended position in which said lower end portion is forwardly in line with said vertical axis, is a substantial distance behind said common axis, and is spaced below said plane to elevate the rear wheel and cooperate with the front wheels in providing stable and immobilized support for the chassis.

The chassis has a footrest which projects forward beyond the front wheels. Movable frame means connected between the chassis and the chair element provides for raising and lowering the chair element and for carrying the chair element forward relative to the chassis as it is lowered and rearward as it is raised. The movable frame means comprises front and rear legs, each having an upper pivotal connection with the chair element and a lower pivotal connection with the chassis, each pivotal connection defining an axis which is parallel to said common axis. The front leg has its lower pivotal connection rearwardly adjacent to said common axis and its upper pivotal connection near the front edge of the seat member, while the rear leg has its lower pivotal connection spaced a distance to the rear of the lower pivotal connection of the front leg and has its upper pivotal connection near the rear edge of the seat member. A lift actuating means, preferably comprising a hydraulic cylinder jack, is connected between the movable frame means and the chassis for swinging the front and rear legs about their lower pivotal connections. Preferably the distance between the lower pivotal connections of the front and rear legs is smaller than the distance between their upper pivotal connections, and the front leg is longer than the rear leg so that raising and lowering of the chair element is accompanied by tilting thereof whereby the front edge of the seat member swings down relative to its rear edge as the chair element is lowered.

BRIEF DESCRIPTION OF DRAWINGS

In the accompanying drawings, which illustrate what is now regarded as a preferred embodiment of the invention.

DETAILED DESCRIPTION OF PREFERRED EMBODIMENT OF THE INVENTION

The wheel chair of this invention comprises a chair element 5 having a seat member 6 and a back rest 7, both of which are preferably padded and upholstered to be comfortable for long periods of occupancy. Arm rests 8 are connected to the back rest 7 to be swingable between normal positions at the sides of the seat member and raised positions in which they project up along opposite sides of the back rest. Projecting forwardly from the front end of one arm rest 8 is a small horizontal control panel 9 on which are mounted switches or the like for controlling the powered functions of the wheel chair.

The chair element 5 is mounted on a chassis 10 that has two driven front wheels 11, one at each side, and a freely rotatable and castering rear wheel 12. A movable frame 14, connected between the chair element 5 and the chassis 10, provides for raising and lowering the chair element as described hereinafter.

The chassis 10 has a front portion 15 with a width about equal to that of the chair element 5. The front wheels 11 are coaxially mounted at opposite sides of this front portion 15, which also comprises a footrest 16 that projects forwardly beyond the front wheels. Projecting rearwardly and at an upward inclination from the front portion 15 of the chassis is a sturdy, rigid spar 17 that extends along the longitudinal centerline of the wheel chair. Fixed to the rear end of this spar 17 is an upright tubular socket 18 that rotatably receives the swivel trunnion 19 of a castering fork 20 in which the rear wheel 12 is rotatably mounted. The upright swiveling axis of the trunnion 19 is approximately downwardly in line with the back rest 7 of the chair element and is, of course, equidistant from the two front wheels 11.

The common axis of the two front wheels 11 is contained in a laterally extending vertical plane that lies near the front edge 21 of the chair element seat member 6. Over the front wheel axis, just behind the footrest 16, the chassis has a raised boxlike portion 22 which extends across its full width and which houses and supports a pair of reversible permanent magnet motors 23, one for each of the front wheels 11, whereby those wheels are driven independently of one another. The motors 23 and other electrical devices described hereinafter are powered from a pair of storage batteries 24 that are mounted on the chassis, rearwardly adjacent to its boxlike portion 22 and adjacent to opposite sides of its spar 17. The motors 23 are controlled for their independent operation by switching means of a known type on the control panel 9, preferably comprising a single "joystick" control of the general type disclosed by U.S. Pat. No. 3,100,860 to H. Rosenthal and No. 4,415,049 to J. A. Wereb. With each motor 23 thus controlled for operation independently of the other, for rotation in either direction and at any speed within its range, and with the rear wheel 12 freely rotating and castered, the wheel chair is readily maneuverable in confined spaces and can be turned within its own length.

At this point attention is directed to the fact that the front wheels 11 are of relatively small diameter (e.g., 8 or 9 inches) as compared with the large diameter main wheels conventional on wheel chairs, while the rear wheel 12 may have a smaller diameter (e.g., 6 to 8 inches) than the front wheels. Thus the tops of all three wheels 11 and 12 are well below the level of the seat member 6 of the chair element. The relatively small diameter of the wheels 11, 12 disposes their axles at a low level and makes for a very low center of gravity and corresponding stability against tilting. Because of their small radii, the wheels also extend only small distances in the forward and rearward directions, thus enabling the wheel chair of this invention to have a relatively small overall length even though the axes of the front and rear wheels are spaced apart by a substantial distance that further contributes to stability against tilting. In particular it should be noted that the front wheels 11 are wholly to the rear of the footrest 16 while the rear wheel 12, even in its most rearward position of castering, projects only a small distance rearwardly beyond the back rest 7. Since a motorized wheel chair is almost invariably operated on a relatively smooth paved surface or floor, no significant loss of smooth riding qualities results from the small diameter wheels.

To provide for braking the wheel chair of this invention and positively confining it against any horizontal motion, it has an elongated brake member 26, an upper end of which has a pivot connection 27 with the spar 17 of the chassis. The axis of the pivot connection 27, which is spaced behind the front end of the spar 17, extends horizontally, parallel to the common axis of the front wheels; and the brake member 26 is swingable about it between a raised inoperative position, closely underlying the spar 17 (FIG. 2) and a lowered braking position (FIG. 3). In its raised position the brake member 26 is wholly spaced above the plane P that is tangent to the bottoms of the three wheels, which is to say that it is clear of the floor or other surface upon which the wheel chair rests. In a position of the brake member in which it is less than fully lowered, its lower end is in the plane just mentioned, to drag on the floor or pavement for rapid deceleration of the wheel chair. In its fully lowered position its lower end projects below said plane, engaging the floor or other surface to raise the rear wheel 12 out of contact therewith. Since the brake member extends generally rearward from its pivotal connection 27 with the chassis spar 17, it engages the floor at a substantial distance behind the front wheels 11 and, when fully lowered, it cooperates with the front wheels in providing stable support for the wheel chair and resisting its movement in all horizontal directions. To prevent damage to carpeting or the like that the brake member engages, a shoe 29 at its lower end provides a flat under-surface of some area and has a pivotal connection 30 to the brake member, near the lower end thereof, that allows the shoe to adjust itself to the orientation in which it rests flat on the engaged surface.

For raising and lowering the brake member 26, a double-acting hydraulic cylinder jack 31 is connected between it and the chassis spar 17. Specifically, the cylinder of the jack 31 has a pivotal connection 32 with a rigid strut 33 that projects down from the spar 17, while its piston rod has a pivotal connection 34 with the brake member, spaced below the pivotal connection 27 between the brake member and the spar. The brake member 26 preferably has a small curve or obtuse-angle bend intermediate its ends, in the zone of its connection 34 to the jack 31. In the raised position of the brake member, to which it is actuated by retraction of the hydraulic jack 31, the jack closely underlies the spar 17, while the lower portion of the brake member, below the bend therein, closely underlies the jack. The apparatus for energizing and controlling the jack 31 is described hereinafter.

The above mentioned strut 33 on the chassis spar 17 has secured to its bottom a transverse spar 35 that projects laterally to both sides of the wheel chair and supports the rear edges of rectangular battery carrying plates 124, one at each side of the longitudinal chassis spar 17. The front edges of these plates 124 are secured to the wider front portion 15 of the chassis, at the rear thereof.

The movable frame means 14 by which the chair element 5 is connected with the chassis 10 for raising and lowering comprises a seat supporting member 36 which the seat member 6 of the chair element overlies, a front swinging leg 37 that has a lower pivotal connection 38 with the chassis and an upper pivotal connection 39 with the seat supporting member 36, and a rear swinging leg 40 that has a lower pivotal connection 41 with the chassis spar 17 and an upper pivotal connection 42 with the seat supporting member 36. The axes of the several pivotal connections 38, 39, 41 and 42 are all parallel to the common axis of the front wheels 11.

The seat supporting member 36 is more or less fork-shaped in planform, having a U-shaped front portion with a pair of arms 44 that project forward from a transverse beam 45 and having a spar 46 that projects rearward from the beam 45 and is coplanar with the arms 44.

The front swinging leg 37 of the movable frame comprises a pair of lower leg elements 48 which are rigidly connected at their upper ends by a laterally extending strut 49 and which are spaced apart by a distance substantially equal to the width of the chassis, and a pair of upper leg elements 50 which project up from the strut 49 and which are spaced apart laterally by a substantially smaller distance than the lower leg elements 48 to have their upper ends laterally outwardly contiguous to the front ends of the arms 44 of the seat supporting member 36 and respectively pivoted to them by the upper front pivotal connections 39. The lower leg elements 48 of the front swinging leg 37 have their pivotal connections 38 to the chassis located just behind the front wheels, and each has a bend or curve 51 along its length so that in a lowered position of the chair element the portion of each that is below the bend 51 extends nearly vertically up from the pivotal connection 38 while the remainder of each extends forwardly over the front wheel 11.

The rear swinging leg 40 of the movable frame is preferably duplicated, comprising a pair of identical rear leg elements, one at each side of the respective spars 17 and 46 of the chassis and of the seat supporting member. Lifting and controlled lowering of the chair element 5 is effected by means of a double-acting hydraulic cylinder jack 53 that is connected between the chassis and the movable frame means. As here shown, the cylinder of the jack 53 has a pivotal connection 54 to an upright gusset 55 that reinforces the connection between the chassis spar 17 and the box-like portion 22 of the chassis, and the piston of that jack has a pivotal connection 56 with the rear swinging leg 40, between its parallel leg elements and intermediate its upper and lower pivotal connections 41, 42. Extension of the lift jack 53 raises the chair element 5.

Figure 1:
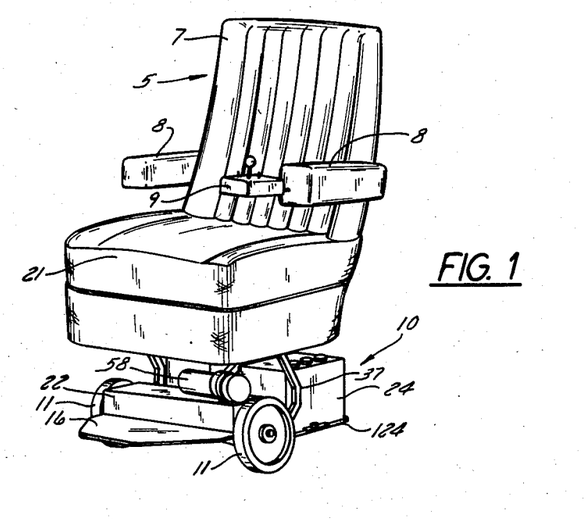
FIG. 1 is a perspective view of a wheel chair embodying the principles of this invention.
Figure 2:
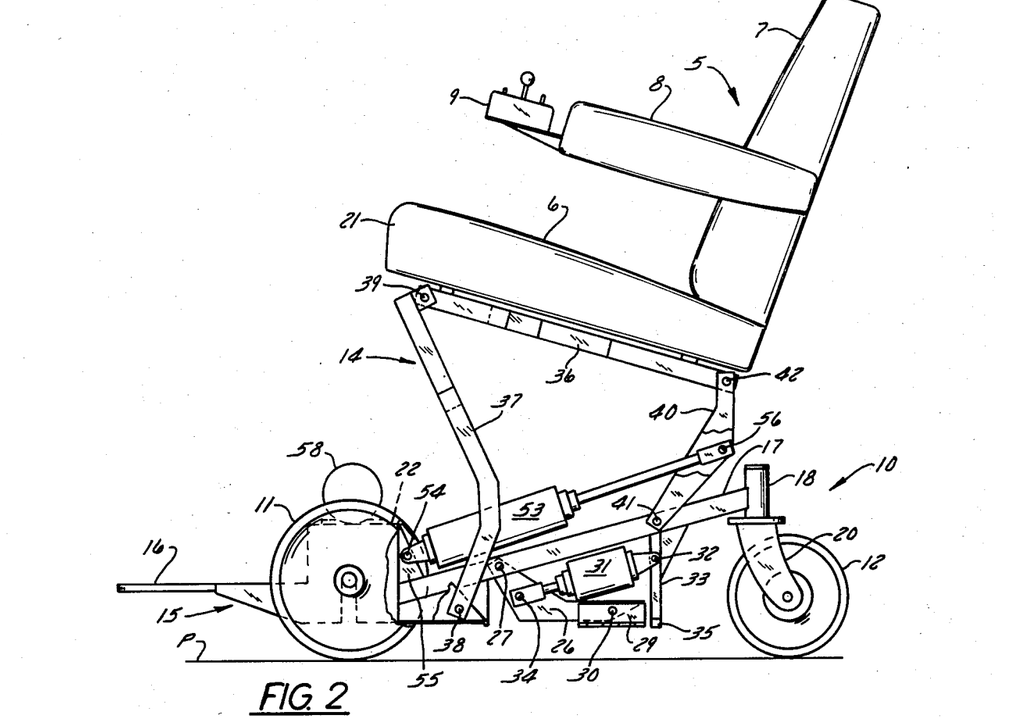
FIG. 2 is a side view of the wheel chair with the chair element in its fully raised position and the brake retracted.
Figure 3:
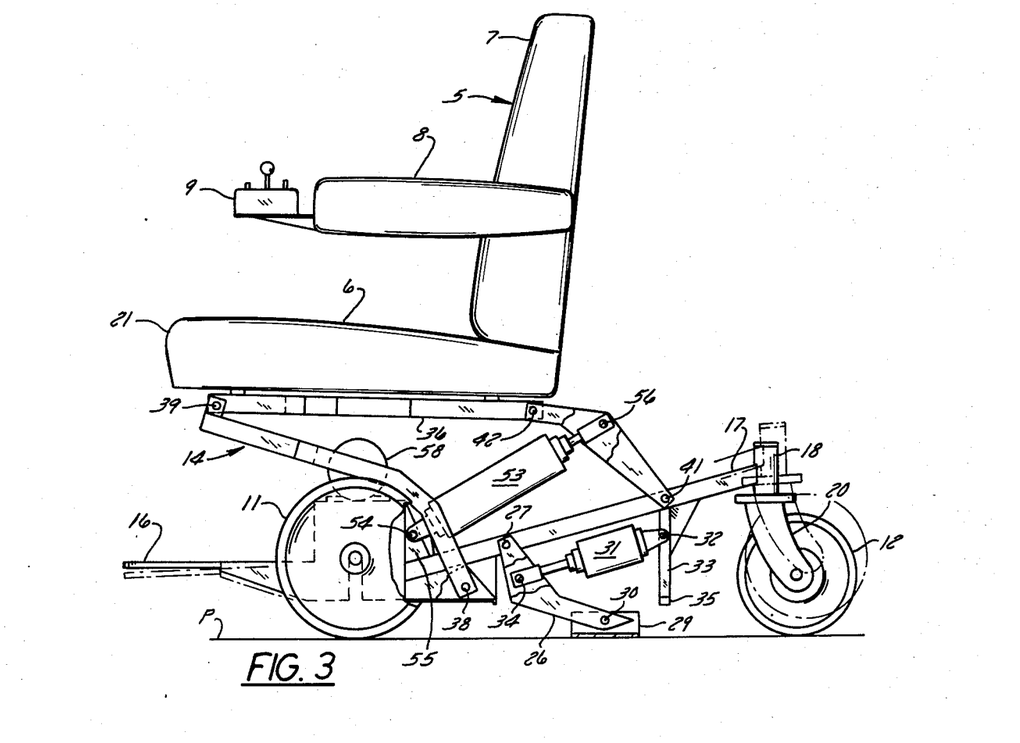
FIG. 3 is a view similar to FIG. 2 but showing the chair element fully lowered and the brake extended.

As can be seen from a comparison of FIGS. 2 and 3, as the chair element 5 is raised it also moves rearward through a substantial distance and, in addition, tilts in the direction to raise the front edge 21 of the seat member 6 relative to its rear edge; whereas during lowering the chair element moves forward and tilts in the direction to bring the front edge of its seat member to a lower level than its rear edge. When the chair element is in its fully raised position, the seat member 6 of the chair element is at a somewhat higher level than the seat member of a conventional stationary chair, so that the wheel chair occupant's feet can rest comfortably on the footrest 16 and he or she can have convenient access to a counter or similar surface that is a little higher than a table top. The forward motion of the chair element 5 as it is lowered carries the front edge of the seat member to a position nearly over the front edge of the footrest 16, thus placing the seat occupant in a position such that, with knees comfortably bent, the feet are on the floor in front of the footrest and the footrest is effectively out of the way during transfer between the wheel chair and another seat. The forward and downward tilting of the seat member as it moves down and forward also facilitates transfer to and from the wheel chair.

To provide for the compound vertical, horizontal and tilting movements of the chair element, the front swinging leg 37 of the movable frame means is substantially longer than the rear swinging leg 40, and those legs have their respective upper pivot connections 39, 42 near the front edge and the rear edge, respectively, of the seat member 6 and thus spaced apart by a distance substantially greater than the distance between their respective lower pivot connections 38, 42 to the chassis.

Figure 4:
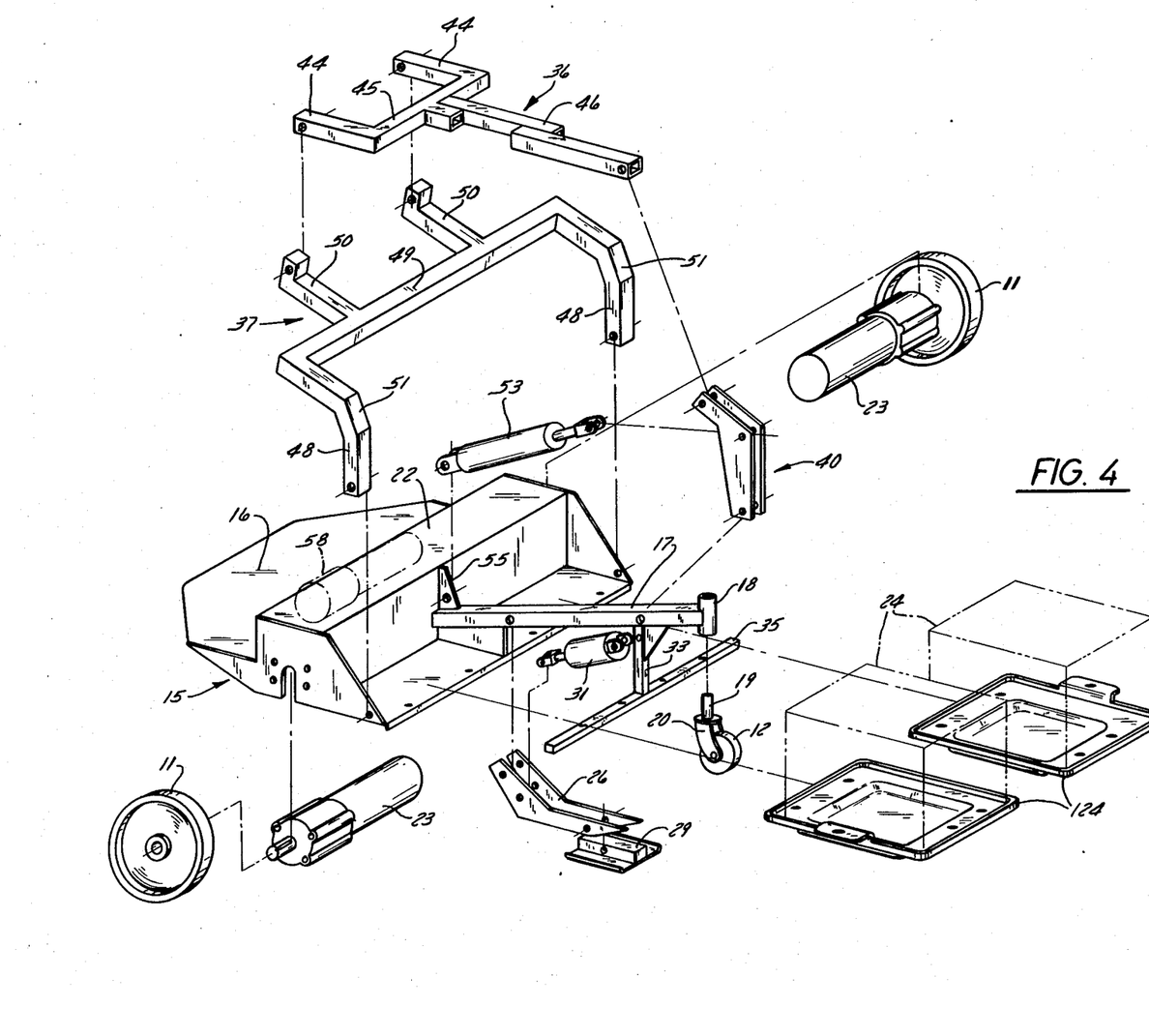
FIG. 4 is an exploded perspective view of the chassis and the movable frame.
Figure 5:
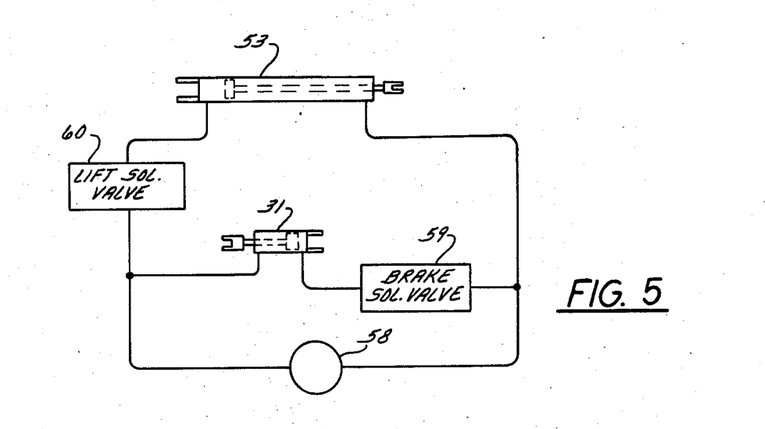
FIG. 5 is a diagram of the hydraulic system.

The source of hydraulic pressure fluid for both the brake jack 31 and the lifting jack 53 is a reversible electrically driven hydraulic pump 58 mounted on top of the box-like portion 22 of the chassis. The spar 46 of the seat supporting member 36 is "spliced" as shown in FIG. 4 to clear the pump, which is preferably of a commercially available type wherein a small fluid reservoir as well as the pump mechanism and the reversible motor that drives it are contained in a single housing. The pump 58 is connected with the jacks 31 and 53 in a hydraulic circuit (FIG. 5) that also comprises a pair of solenoid valves 59, 60, one for each jack. The jacks 31, 53 are connected with the pump 58 in parallel with one another, and each solenoid valve 59, 60 is connected in series with its jack 31, 53, at the side thereof for controlling flow of pump fluid to and from the blind end of the jack cylinder. Each solenoid valve is normally closed and is open when electrically energized. When closed, each solenoid valve locks fluid into the cylinder of its jack, preventing both extension and retraction of that jack. When open, the solenoid valve permits flow of fluid to and from its jack so that the jack either extends or retracts, depending upon the direction in which the pump 58 is being driven.

The electrical circuit (FIG. 6) in which the solenoid valves 59 and 60 are connected is so arranged that only one of them can be energized at a time. It comprises a center-off single-pole double-throw brake control switch 62 and a similar raise/lower switch 63, three relays 64, 65, 66 and a rectifier network 67, 68, 69, 70.

Figure 6:
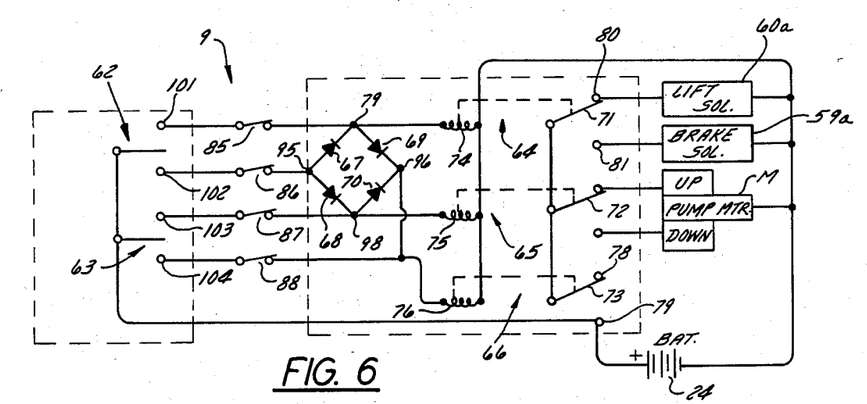
FIG. 6 is a diagram of the electrical system.

The relay 66 is an on/off relay that has its armature 73 connected with the armatures 71, 72 of the other two relays. When the winding 76 of the on/off relay 66 is unenergized, its armature 73 contacts a dead terminal 78, but when that winding 76 is energized the armature 73 engages a terminal 79 that is connected with the ungrounded terminal of the battery 24.

Each of the other two relays 64, 65 is a single-pole double-throw relay. The relay 64 is a lift/brake relay that has one armature terminal 80 connected with the solenoid 60a of the lift jack solenoid valve 60 and has its other armature terminal 81 connected with the solenoid 59a of the brake jack solenoid valve 59. In the unenergized condition of the lift/brake relay 64, its armature 71 engages the lift jack solenoid terminal 80, but that solenoid 60a is energized only if and when the on/off relay 66 is energized. When the winding 74 of the lift/brake relay 64 is energized, the solenoid 59a of the brake jack solenoid valve 60 is energized through the on/off relay 66, the winding 76 of which is energized at the same time, as explained hereinafter. It will be seen that the lift/brake relay 64 prevents simultaneous operation of the two hydraulic jacks 31, 53, even though both control switches 62, 63 are simultaneously actuated to "on" conditions.

The up/down relay 65 controls operation of the pump motor M. In its normal (unenergized) condition relay 65 connects the pump motor M for running in a forward direction in which the brake jack is actuated to drive the brake member 26 down or the lift 53 jack is actuated for lifting, depending upon the condition of the lift/brake relay 64; but the pump motor is energized only when the on/off relay 66 is energized. When the winding 75 of the up/down relay 65 is energized, the winding 76 of the on/off relay 66 is also energized, as explained below, and the pump motor M runs in the opposite direction, for brake release and chair member lowering.

The manually actuatable contactor of each of the center-off control switches 62, 63 is connected with the ungrounded side of the battery 24.

If either of those control switches 62, 63 is actuated to an "on" condition, the on/off relay 66 is energized, causing the pump motor M to run in the appropriate direction and the appropriate solenoid valve 59a, 60a to be energized. A limit switch 85, 86, 87, 88 is connected in series with each terminal 101-104 of each of the control switches 62, 63. Each limit switch is actuated by one of the jacks 31, 53 in a mechanical arrangement that will be obvious, so that when a jack reaches a limit of extension or retraction defined by the appropriate limit switch, the pump motor M will be shut off and the solenoid valve 59a, 60a will be closed, even though the control switch continues to be held in an "on" position.

The rectifier network 67-70, which is connected in series with three of the limit switches 85, 86, 87 and with the windings 74, 75, 76 of the three relays, provides for automatic selection of relays to be energized in accordance with the positioning of the control switches 62, 63. The rectifier network comprises four rectifiers connected in a bridge circuit to provide one input terminal 95, one output terminal 96 and two input-output terminals 97, 98. The winding 76 of the on/off relay 66 is connected with the output terminal 96, and the windings 74, 75 of the lift/brake relay 64 and of the up/down relay 65 are respectively connected with the input/output terminals 97 and 98. Through the respective limit switches 85-88, the "up" terminal 101 of the brake switch 62 is connected with the input/output terminal 97, the "down" terminal 102 of that control switch is connected with the input terminal 95, and the "lift" terminal 103 of the lift/lower switch 63 is connected with the input/output terminal 98. The "lower" terminal 104 of the lift/lower switch 63 is not connected with the rectifier network, but only with the winding 76 of the on/off relay 66.

It will be seen that when the brake switch 62 is actuated to its "up" position, the winding 74 of the lift/brake relay 64 is directly energized from it and the winding 76 of the on/off relay 66 is energized through the rectifier 69, while energization of the winding 75 of the up/down relay 65 is prevented by the rectifiers 70 and 67. In the "down" position of the brake switch 62 the lift/brake relay winding 75 is energized through the rectifier 68, the up/down relay winding 74 is energized through the rectifier 67, and the on/off relay winding is energized through all four rectifiers. In the "lower" position of the lift/lower switch 63 the winding 75 of the up/down relay 65 is directly energized through that switch, the winding 76 of the on/off relay 66 is energized through the rectifier 70, and the rectifiers 68 and 69 prevent energization of the winding 74 of the lift/brake relay. In the "raise" position of the lift/lower switch 63 only the winding 76 of the on/off relay 66 is energized and the rectifiers 69 and 70 prevent energization of the windings of the other two relays.

From the foregoing description taken with the accompanying drawings it will be apparent that this invention provides a powered wheel chair which is compact and very maneuverable, being capable of turning in its own length, but is nevertheless very stable, and which greatly facilitates transferring because of the security with which it can be braked, the ease with which its seat member can be raised and lowered under power, and the forward component of motion of its seat member as it is being lowered, whereby the seat member is brought to a position in which the footrest is out of the occupant's way.

What is claimed as the invention is:

1. A wheel chair comprising a chair element having a seat member with front and rear edges and an upwardly projecting back rest, a chassis on which the chair element is supported, wheels on said chassis, and power drive means on the chassis whereby certain of the wheels are driven, said wheel chair being characterized by:

A. said wheels comprising
   (1) two front wheels, one at each side of the chassis, confined to rotation on a common axis that is near a vertical plane containing said front edge of the seat member, and
   (2) a rear wheel which has a castering connection with the chassis to swivel about a vertical axis which is spaced a substantial distance behind said common axis and is substantially equidistant from the two front wheels;

B. said drive means comprising a pair of reversible motors, one for each of said front wheels, each said motor being connected with its front wheel to drive the same independently of the other front wheel;

C. a brake member having a surface-engaging lower end portion; and

D. means mounting the brake member on the chassis for movement relative thereto between an upwardly retracted position in which all portions of the brake member are spaced above a plane tangent to the bottoms of all of said wheels and a downwardly extended position in which said lower end portion is forwardly in line with said vertical axis, is a substantial distance behind said common axis, and is spaced below said plane to elevate the rear wheel and cooperate with the front wheels in providing stable and immobilized support for the chassis.

2. The wheel chair of claim 1 wherein the chassis comprises a footrest which projects forward beyond the front wheels, further characterized by:

(1) movable frame means connected between the chassis and the chair element to provide for raising and lowering the chair element and whereby the chair element is carried forward relative to the chassis during lowering and rearward during raising, said movable frame means comprising front and rear legs, each having an upper pivotal connection with the chair element and a lower pivotal connection with the chassis, each said pivotal connection defining an axis which is parallel to said common axis, (a) said front leg having its lower pivotal connection rearwardly adjacent to said common axis and its upper pivotal connection near the front edge of the seat member, and (b) said rear leg having its lower pivotal connection spaced a distance to the rear of the lower pivotal connection of the front leg and having its upper pivotal connection near the rear edge of the seat member; and (2) lift actuating means connected between said movable frame means and the chassis for swinging said front and rear legs about their lower pivotal connections.

3. The wheel chair of claim 2, further characterized by:

(1) said distance between said lower pivotal connection of the front and rear legs being less than the distance between their upper pivotal connections, and (2) the front leg being longer than the rear leg, so that raising and lowering of the chair element is accompanied by tilting thereof whereby said front edge swings down relative to said rear edge as the chair element is lowered.

4. A wheel chair comprising a chair element having a seat member with front and rear edges and an upwardly projecting back rest, a chassis on which the chair element is supported, wheels on said chassis, and power drive means on the chassis whereby certain of the wheels are driven, said wheel chair being characterized by:

A. said chassis having
 (1) a front portion that has a width substantially equal to that of the chair element,
 (2) a footrest which projects forwardly from said front portion, and
 (3) a rear portion comprising a rigid spar which projects rearwardly from the center of said front portion;

B. said wheels comprising
 (1) a pair of front wheels, one at each side of said front portion, confined to rotation on a common axis, and
 (2) a rear wheel having a castering connection with the rear end portion of said spar to swivel about a vertical axis which is spaced a substantial distance behind said common axis;

C. said drive means comprising a pair of reversible motors, one for each of said front wheels, each of said motors being mounted on said front portion of the chassis and being connected with its front wheel to drive the same independently of the other front wheel;

D. a brake member having a surface-engaging lower end and having near its upper end a pivotal connection with said spar which is spaced behind said front portion of the chassis and about which the brake member is swingable to carry its lower end between a retracted position in which all portions of the brake member are spaced above a plane tangent to the bottoms of all of the wheels and an extended position in which the lower end of the brake member is spaced below said plane and the brake member elevates the rear wheel and cooperates with the front wheels in providing stable and immobilizing support for the chassis.

5. The wheel chair of claim 4 further characterized by: a plurality of swingable legs, each having at an upper end thereof a pivotal connection with the chair element and at a lower end thereof a pivotal connection with the chassis about which the upper end of the leg is swingable, said legs and their pivotal connections being arranged to provide for raising and lowering of the chair element relative to the chassis and for movement of the chair element forward with lowering and rearward with raising, and to dispose the chair element, when fully lowered, in a position in which it is substantially over the footrest.

6. The wheel chair of claim 5, further characterized by:

(1) each of said front wheels having a diameter to be wholly below the level of the chair element and substantially wholly behind said footrest; and (2) said rear wheel having a diameter no larger than that of said front wheels.

7. The wheel chair of claim 4 in which said motors are electric motors, further characterized by:
a pair of batteries for energizing said motors, said batteries being supported on the chassis at opposite sides of said spar and behind said front portion of the chassis.

8. A wheel chair comprising a chair element having a seat member with front and rear edges, opposite sides and an upwardly projecting back rest, a chassis on which the chair element is supported and which comprises a forwardly projecting footrest, wheels on said chassis, and power drive means on the chassis whereby certain of the wheels are driven, said wheel chair being characterized by:

A. front and rear legs connected between the chassis and the chair element to provide for raising and lowering the chair element and whereby the chair element is carried rearward during raising and forwardly during lowering to have a lowered position in which the chair element is over substantially the whole of the footrest, each of said legs having
 (1) an upper pivotal connection to the chair element and
 (2) a lower pivotal connection to the frame, all of said pivotal connections extending horizontally in the direction from side to side of the chair element; and B. powered means connected with said legs for raising and controlledly lowering the chair element.

9. The wheel chair of claim 8 wherein said upper connections of the front and rear legs are spaced apart by a greater fore-and-aft distance than the lower connections of those legs so that the chair element rocks as it is raised and lowered to dispose said front edge of the seat member below the rear edge thereof when the chair element is fully lowered and above said rear edge when the chair element is fully raised.

10. The wheel chair of claim 8, further characterized by:

(1) said wheels comprising
 (a) a pair of front wheels rotatable on a common axis that extends in said direction and
 (b) a rear wheel castered to swivel about a vertical axis that is spaced behind said common axis and is equidistant from the two front wheels; and (2) said drive means comprising a pair of reversible motors, one for each of said front wheels, each connected with its front wheel to drive the same independently of the other.

11. The wheel chair of claim 10 wherein the diameter of the front wheels is such that eah of them is wholly below said chair element and sustantially wholly behind said footrest, and the diameter of the rear wheel is no greater than that of the front wheels.

12. The wheel chair of claim 10 further characterized by: a brake member connected to said chassis behind said rear wheel for movement between a retracted position in which the brake member is wholly above a plane tangent to the bottoms of all of said wheels and an extended position in which the brake member projects below said plane to cooperate with the front wheels in supporting and immobilizing the wheel chair.

* * * * *